United States Patent
Kobayashi et al.

(10) Patent No.: US 9,536,646 B2
(45) Date of Patent: Jan. 3, 2017

(54) SINTERED FERRITE MAGNET AND ITS PRODUCTION METHOD

(71) Applicant: HITACHI METALS, LTD., Tokyo (JP)

(72) Inventors: Yoshinori Kobayashi, Mishima-gun (JP); Tsunehiro Kawata, Mishima-gun (JP)

(73) Assignee: HITACHI METALS, LTD., Tokyo (JP)

( * ) Notice: Subject to any disclaimer, the term of this patent is extended or adjusted under 35 U.S.C. 154(b) by 76 days.

(21) Appl. No.: 14/429,502

(22) PCT Filed: Aug. 30, 2013

(86) PCT No.: PCT/JP2013/073363
§ 371 (c)(1),
(2) Date: Mar. 19, 2015

(87) PCT Pub. No.: WO2014/050433
PCT Pub. Date: Apr. 3, 2014

(65) Prior Publication Data
US 2015/0235748 A1 Aug. 20, 2015

(30) Foreign Application Priority Data
Sep. 28, 2012 (JP) .................. 2012-218038

(51) Int. Cl.
| | |
|---|---|
| H01F 1/11 | (2006.01) |
| H01F 41/02 | (2006.01) |
| C04B 35/26 | (2006.01) |
| C04B 35/40 | (2006.01) |
| C04B 35/63 | (2006.01) |
| C04B 111/00 | (2006.01) |
| C04B 111/10 | (2006.01) |

(52) U.S. Cl.
CPC ............. *H01F 1/11* (2013.01); *C04B 35/2641* (2013.01); *C04B 35/6303* (2013.01); *H01F 41/02* (2013.01); *C04B 2111/00422* (2013.01); *C04B 2111/10* (2013.01); *C04B 2235/60* (2013.01); *C04B 2235/72* (2013.01)

(58) Field of Classification Search
CPC ............. C04B 35/2641; C04B 35/6303; C04B 2111/00422; C04B 2111/10; C04B 2235/60; C04B 2235/72; H10F 1/10; H10F 1/11; H10F 41/02
See application file for complete search history.

(56) References Cited

U.S. PATENT DOCUMENTS

| | | |
|---|---|---|
| 5,846,449 A | 12/1998 | Taguchi et al. |
| 6,139,766 A | 10/2000 | Taguchi et al. |
| 6,402,980 B1 | 6/2002 | Taguchi et al. |
| 7,758,767 B2 | 7/2010 | Kobayashi et al. |
| 7,837,893 B2 | 11/2010 | Takami et al. |
| 8,021,567 B2 | 9/2011 | Takami et al. |
| 8,206,606 B2 | 6/2012 | Hosokawa et al. |
| 8,591,760 B2 | 11/2013 | Yanagida et al. |
| 9,162,928 B2 | 10/2015 | Oda et al. |
| 2007/0194269 A1 | 8/2007 | Kobayashi et al. |
| 2009/0022992 A1 | 1/2009 | Takami et al. |
| 2009/0261288 A1 | 10/2009 | Hosokawa et al. |
| 2009/0314981 A1 | 12/2009 | Yanagida et al. |
| 2010/0237273 A1 | 9/2010 | Kobayashi et al. |
| 2011/0024672 A1 | 2/2011 | Takami et al. |
| 2012/0105185 A1 | 5/2012 | Oda et al. |
| 2012/0280167 A1 | 11/2012 | Yanagida et al. |
| 2014/0097378 A1 | 4/2014 | Yanagida et al. |
| 2015/0221424 A1 | 8/2015 | Kobayashi et al. |
| 2015/0332819 A1 | 11/2015 | Oda et al. |

FOREIGN PATENT DOCUMENTS

| | | |
|---|---|---|
| EP | 0758786 A1 | 2/1997 |
| EP | 2450922 A1 | 5/2012 |
| EP | 2881956 A1 | 6/2015 |
| JP | 10-149910 A | 6/1998 |
| JP | 1 1-1 54604 A | 6/1999 |
| JP | 3181559 B2 | 7/2001 |
| JP | 2006-104050 A | 4/2006 |
| JP | 2009-027032 A | 2/2009 |
| JP | 2011-213575 A | 10/2011 |
| WO | 2006/028185 A1 | 3/2006 |
| WO | 2007/060757 A1 | 5/2007 |
| WO | 2007/077811 A1 | 7/2007 |
| WO | 2008/105449 A1 | 9/2008 |

OTHER PUBLICATIONS

Communication dated May 17, 2016 from the European Patent Office issued in corresponding Application No. 13842393.4.
International Search Report of PCT/JP2013/073363 dated Oct. 15, 2013.

*Primary Examiner* — Carol M Koslow
(74) *Attorney, Agent, or Firm* — Sughrue Mion, PLLC

(57) ABSTRACT

A sintered ferrite magnet comprising metal elements of Ca, La, Fe and Co, whose atomic ratios are represented by the general formula of $Ca_{1-x}La_xFe_{2n-y}Co_y$, wherein x and y, and n representing a molar ratio meet $0.3 \leq x \leq 0.6$, $0.25 \leq y \leq 0.5$, and $3 \leq n \leq 6$, and further comprising 0.2% to 0.35% by mass of $SiO_2$.

6 Claims, 2 Drawing Sheets

100 nm 100 nm 100 nm 100 nm

SINTERED FERRITE MAGNET AND ITS PRODUCTION METHOD

CROSS REFERENCE TO RELATED APPLICATIONS

This is a National Stage of International Application No. PCT/JP2013/073363 filed Aug. 30, 2013 (claiming priority based on Japanese Patent Application No. 2012-218038 filed Sep. 28, 2012), the contents of which are incorporated herein by reference in their entirety.

FIELD OF THE INVENTION

The present invention relates to a sintered ferrite magnet and its production method.

BACKGROUND OF THE INVENTION

Sintered ferrite magnets are used in various applications such as motors, electric generators, speakers, etc. As typical sintered ferrite magnets, Sr ferrite ($SrFe_{12}O_{19}$) and Ba ferrite ($BaFe_{12}O_{19}$) having a hexagonal M-type magnetoplumbite structure are known. These sintered ferrite magnets are relatively inexpensively produced by a powder metallurgy method using iron oxide, carbonate of strontium (Sr) or barium (Ba), etc. as raw materials.

To provide electric parts of automobiles, parts of electric equipments, etc. with reduced size and weight and higher efficiency for environmental protection, etc., sintered ferrite magnets are recently required to have higher performance. Particularly demanded in motors used in electric parts of automobiles are sintered ferrite magnets having such high coercivity $H_{cJ}$ that they are not demagnetized by a strong demagnetizing field even when made thinner, as well as high squareness ratios $H_k/H_{cJ}$, while keeping high residual magnetic flux densities $B_r$.

To provide sintered ferrite magnets with improved magnetic properties, JP 10-149910 A and JP 11-154604 A propose methods for improving $H_{cJ}$ and $B_r$ by substituting part of Sr with rare earth elements such as La, etc. and part of Fe with Co in the above Sr ferrites.

Sr ferrites having part of Sr substituted by rare earth elements such as La, etc., and part of Fe substituted by Co, etc. (hereinafter referring to as "SrLaCo ferrite"), which are described in JP 10-149910 A and JP 11-154604 A, have excellent magnetic properties, so that they are widely used in various applications in place of conventional Sr ferrites and Ba ferrites. However, further improvement of magnetic properties is desired.

As sintered ferrite magnets, Ca ferrites are also known in addition to the above Sr ferrites and Ba ferrites. It is known that Ca ferrites have a stable structure expressed by the composition formula of $CaO—Fe_2O_3$ or $CaO·2Fe_2O_3$, and that La added provides the ferrites with a hexagonal crystal structure. However, they have magnetic properties on the same level as those of conventional Ba ferrites, not sufficiently high.

Japanese Patent 3181559 discloses a Ca ferrite having part of Ca substituted by rare earth elements such as La, etc., and part of Fe substituted by Co, etc. for improved $B_r$ and $H_{cJ}$, and improved temperature characteristics of $H_{cJ}$, by having an anisotropic magnetic field $H_A$ of 20 kOe or more (hereinafter referring to "CaLaCo ferrite"). It describes that this anisotropic magnetic field $H_A$ is 10% or more higher than that of Sr ferrites.

However, CaLaCo ferrites have $B_r$ and $H_{cJ}$ on the same level as those of SrLaCo ferrites and extremely poor $H_k/H_{cJ}$, despite a high anisotropic magnetic field $H_A$, failing to meet both requirements of high $H_{cJ}$ and high $H_k/H_{cJ}$, so that they have not been used yet in various applications such as motors, etc.

To improve the magnetic properties of CaLaCo ferrites, various proposals have been made. For example, JP 2006-104050 A proposes a CaLaCo ferrite having optimized atomic ratios of constituent elements and an optimized molar ratio n, with La and Co at a particular ratio. WO 2007/060757 A proposes a CaLaCo ferrite having part of Ca substituted by La and Ba. WO 2007/077811 A proposes a CaLaCo ferrite having part of Ca substituted by La and Sr.

JP 2011-213575 A discloses a ferrite magnet having a composition represented by the formula of $Ca_{1-w-x-y}R_wSr_xBa_yFe_zM_m$, wherein w, x, y, z and m are in particular ranges, and comprising Si as a sub-component; in an X-Y coordinate system in which X axis represents the total amount x1 (% by mass) of z and m, and Y axis represents the amount y1 (% by mass) of Si (as $SiO_2$), x1 and y1 being in a range encircled by four points of a (8.9, 1.2), b (8.3, 0.95), c (10.0, 0.35), and d (10.6, 0.6). It describes that this magnet has high $B_r$ and $H_{cJ}$, as well as high $H_k/H_{cJ}$, wherein $H_k$ represents the value of H at a position in the second quadrant at which J is 0.9 $B_r$ in a curve of J (intensity of magnetization) to H (intensity of magnetic field).

WO 2008/105449 A proposes a method of reducing the particle sizes of crystal grains to increase a magnet density, and controlling the shapes of crystal grains to improve magnetic properties, in a composition containing more Sr and/or Ba than in WO 2007/060757 A and WO 2007/077811 A, by a pulverization process comprising a first fine pulverization step, a heat-treating step of powder obtained in the first fine pulverization step, and a second fine pulverization step of repulverizing the heat-treated powder (hereinafter referring to "heat-treating and repulverizing step").

The CaLaCo ferrites described in JP 2006-104050 A, WO 2007/060757 A, WO 2007/077811 A, JP 2011-213575 A and WO 2008/105449 A have higher magnetic properties than those of the CaLaCo ferrite proposed by Japanese Patent 3181559, namely, such high $H_{cJ}$ and high $H_k/H_{cJ}$ as to keep the ferrites from demagnetization even by a strong demagnetizing field by thinning, together with high $B_r$, as desired recently. However, because they need about 0.3 by atomic ratio of Co, more Co should be used than in sintered SrLaCo ferrite magnets commercially available presently (containing about 0.2 by atomic ratio of Co). Co is ten to several tens of times as expensive as iron oxide, a main component of ferrite magnets. Cost increase of raw materials is thus unavoidable, resulting in more expensive sintered ferrite magnets. Particularly, WO 2008/105449 A conducting a heat-treating and repulverizing step cannot avoid cost increase because of increase in production steps, suffering increase in both raw material cost and production cost.

Because the biggest advantage of sintered ferrite magnets is inexpensiveness, even sintered ferrite magnets having high magnetic properties would not be accepted in the market if they were expensive.

OBJECT OF THE INVENTION

An object of the present invention is to provide an inexpensive sintered ferrite magnet having high magnetic properties.

SUMMARY OF THE INVENTION

To achieve the above object, the inventors have paid attention to sintering aids. As known well, a general sintering process of sintered ferrite magnets is categorized in liquid phase sintering. To accelerate the liquid phase sintering, sintering aids are usually added before sintering (in a pulverization step, etc.). As sintering aids, $CaCO_3$ and $SiO_2$ are well known. Sintering aids such as $CaCO_3$ and $SiO_2$ constitute part of liquid phase components during sintering, and exist in grain boundary phases in the sintered body (sintered magnet).

Sintered ferrite magnets indispensably comprise grain boundary phases. However, because grain boundary phases are non-magnetic, larger amounts of grain boundary phases (larger amounts of sintering aids added) lead to a smaller percentage of main phases (ferrite phases having a hexagonal M-type magnetoplumbite structure), resulting in lower magnetic properties. On the other hand, too small amounts of grain boundary phases (too small amounts of sintering aids added) lead to smaller amounts of liquid phases during sintering, hindering sintering. Accordingly, to improve magnetic properties, the amount of sintering aids added should be a smallest amount necessary for liquid phase sintering, thereby reducing the percentage of grain boundary phases and increasing the percentage of main phases in the sintered body.

As a result of intensive research on the smallest amount of sintering aids necessary for the liquid phase sintering of CaLaCo ferrite, the inventors have found that though both $CaCO_3$ and $SiO_2$ are conventionally added in general, excellent magnetic properties on the same level as in conventional CaLaCo ferrites are obtained, when only $SiO_2$ is added to CaLaCo ferrite, and when the amount of $SiO_2$ is 0.2% to 0.35% by mass, preferably 0.2% to 0.3% by mass, smaller than those considered optimum conventionally. The inventors have also found that when only $SiO_2$ is added in such a small amount as described above, magnetic properties would not be lowered even if the average particle size of finely pulverized powder were made larger than those of conventional CaLaCo ferrites. Why excellent magnetic properties are obtained by adding only $SiO_2$ in a small amount appears to be due to the fact that Ca contained in the CaLaCo ferrite as a main phase component constitutes part of liquid phase components during sintering. Also, why magnetic properties are not deteriorated even when the average particle size of finely pulverized powder is made larger appears to be due to the fact that the amount of liquid phases is optimized during liquid phase sintering. The inventors have further found that these are remarkable not in all of the CaLaCo ferrites described in Japanese Patent 3181559, JP 2006-104050 A, WO 2007/060757 A, WO 2007/077811 A, JP 2011-213575 A and WO 2008/105449 A, but in CaLaCo ferrites having main phases comprising Ca, La, Fe and Co without Sr and Ba.

With respect to the sintering aids, for example, JP 2006-104050 A describes that 0.3-1.5% by mass (as CaO) of $CaCO_3$ and 0.2-1.0% by mass of $SiO_2$ are preferably added when a calcined body is pulverized, showing Example in which 0.6% by mass (as CaO) of $CaCO_3$ and 0.45% by mass of $SiO_2$ are added. WO 2007/060757 A describes that 0.2-1.5% by mass of $CaCO_3$ (corresponding to 0.112-0.84% by mass of CaO) and 0.1-1.5% by mass of $SiO_2$ are preferably added when a calcined body is pulverized, showing Example in which 0.5% by mass of $CaCO_3$ and 0.4% by mass of $SiO_2$ are added. WO 2007/077811 A describes that 1.8% or less by mass of $CaCO_3$ and 1.0% or less by mass of $SiO_2$ are preferably added to a calcined body in the pulverization step, showing Example in which 0.6% by mass (as CaO) of $CaCO_3$ and 0.45% by mass of $SiO_2$ are added. Though any references describe wide ranges of the sintering aids added, the optimum amounts described in Examples are about 0.5% by mass of $CaCO_3$ and about 0.4% by mass of $SiO_2$, both $CaCO_3$ and $SiO_2$ being added.

Though JP 2011-213575 A describes that the total amount of all Si components is preferably 0.35-1.2% by mass, more preferably 0.4-1.1% by mass as $SiO_2$, and that $SiO_2$ and other sub-components may be contained. It describes that for example, a Ca component may be contained as a sub-component, not excluding the possibility of adding $CaCO_3$.

It is known that sintered ferrite magnets have improved magnetic properties, when crystal particle sizes are made smaller, namely, when the particle sizes of a calcined powder (finely pulverized powder) are made smaller in the pulverization step. Though the particle sizes of crystal grains can be made smaller, for example, by a heat-treating and repulverizing step described in WO 2008/105449 A, cost increase due to increase in the number of production steps cannot be avoided as described above. Also, smaller crystal particle sizes lead to larger specific surface areas of crystal grains, so that the amount of sintering aids should be increased to accelerate liquid phase sintering.

On the other hand, with larger crystal particle sizes, namely, larger particle sizes of a calcined powder (finely pulverized powder) in the pulverization step, a process cost can be reduced by shorter pulverization time and dewatering time during press-molding, namely a shorter pressing cycle, despite low magnetic properties. Also, the life of a press-molding die can be expanded by a shorter pressing cycle, resulting in a lower production cost. Further, because crystal grains have smaller specific surface areas, the amount of sintering aids added can be reduced.

Because the amount of a sintering aid can be drastically reduced than before as described above, the sintered body has a lower percentage of grain boundary phases and a higher percentage of main phases, resulting in higher magnetic properties. Also, even when the average particle size of the finely pulverized powder is larger than those of conventional CaLaCo ferrites, the magnetic properties are not lowered. Accordingly, even with a larger average particle size of finely pulverized powder than those of conventional CaLaCo ferrites, magnetic properties on the same level as those of conventional CaLaCo ferrites can be secured.

Namely, because of a smaller amount of a sintering aid than in conventional CaLaCo ferrites, the material cost can be reduced. Also, even with a larger average particle size of finely pulverized powder, the magnetic properties are not reduced. Accordingly, with a large average particle size of finely pulverized powder, excellent magnetic properties on the same level as those of conventional CaLaCo ferrites are kept; a process cost can be reduced by a shorter pulverization time and a shorter pressing cycle (a shorter dewatering time during press-molding); and the life of a press-molding die can be expanded by a shorter pressing cycle, resulting in a reduced production cost. As a result, inexpensive sintered ferrite magnets having excellent magnetic properties can be obtained.

Thus, the sintered ferrite magnet of the present invention comprises metal elements of Ca, La, Fe and Co, whose atomic ratios are represented by the general formula:

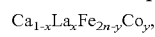

wherein x and y, and n representing a molar ratio meet
0.3≤x≤0.6,
0.25≤y≤0.5, and
3≤n≤6,
and further comprising 0.2% to 0.35% by mass of $SiO_2$.

The amount of $SiO_2$ is preferably 0.2% to 0.3% by mass.

The method of the present invention for producing a sintered ferrite magnet comprises the steps of mixing raw material powders to a composition comprising metal elements of Ca, La, Fe and Co, whose atomic ratios are represented by the general formula:

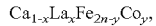
$Ca_{1-x}La_xFe_{2n-y}Co_y$, wherein x and y, and n representing a molar ratio meet
$0.3 \leq x \leq 0.6$,
$0.25 \leq y \leq 0.5$, and
$3 \leq n \leq 6$,
thereby obtaining a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

0.2% to 0.35% by mass of $SiO_2$ being added to 100% by mass of the calcined body or the calcined powder.

Another method of the present invention for producing a sintered ferrite magnet comprises the steps of mixing raw material powders to a composition comprising metal elements of Ca, La, Fe and Co, whose atomic ratios are represented by the general formula:

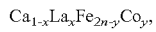
$Ca_{1-x}La_xFe_{2n-y}Co_y$, wherein x and y, and n representing a molar ratio meet
$0.3 \leq x \leq 0.6$,
$0 \leq y \leq 0.5$, and
$3 \leq n \leq 6$,
thereby obtaining a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

a raw material powder of Co being added to the calcined body or the calcined powder, such that the above y meets $0.25 \leq y \leq 0.5$, and 0.2% to 0.35% by mass of $SiO_2$ being added to 100% by mass of the calcined body or the calcined powder.

The amount of $SiO_2$ added is preferably 0.2% to 0.3% by mass.

BRIEF DESCRIPTION OF THE DRAWINGS

FIG. 5 is a photograph showing a binarized backscattered electron image of the structure observed by FE-SEM of the sintered ferrite magnet of Sample 4 in Example 1.

FIG. 6 is a photograph showing a binarized backscattered electron image of the structure observed by FE-SEM of the sintered ferrite magnet of Sample 7 in Example 1.

DESCRIPTION OF THE PREFERRED EMBODIMENTS

[1] Sintered Ferrite Magnet

Figure 1A:
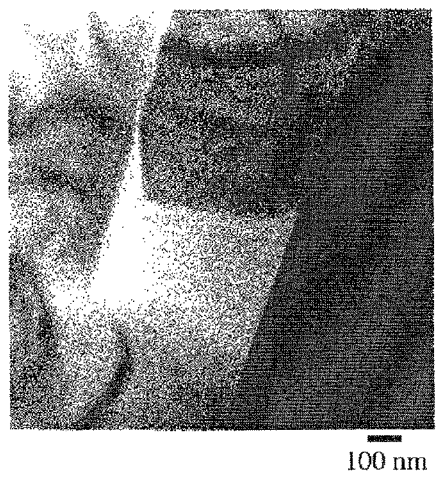
FIG. 1A is a photograph showing the structure observation results by FE-TEM of the sintered ferrite magnet of Sample 4 in Example 1.

The sintered ferrite magnet of the present invention comprises metal elements of Ca, La, Fe and Co, whose atomic ratios are represented by the general formula:

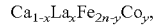
$Ca_{1-x}La_xFe_{2n-y}Co_y$, wherein x and y, and n representing a molar ratio meet
$0.3 \leq x \leq 0.6$,
$0.25 \leq y \leq 0.5$, and
$3 \leq n \leq 6$,
and further contains 0.2% to 0.35% by mass of $SiO_2$.

The sintered ferrite magnet of the present invention comprises as main phases ferrite phases having a hexagonal M-type magnetoplumbite structure. In general, a magnetic material, particularly a sintered magnet, is composed of pluralities of compounds, and a compound determining the properties (physical properties, magnetic properties, etc.) of the magnetic material is defined as "a main phase." A main phase in the present invention, namely, a ferrite phase having a hexagonal M-type magnetoplumbite structure, determines the basic properties such as physical properties, magnetic properties, etc. of the sintered ferrite magnet of the present invention.

"Having a hexagonal M-type magnetoplumbite structure" means that a hexagonal M-type magnetoplumbite structure is mainly observed in an X-ray diffraction pattern of a ferrite calcined body measured under a general condition.

The sintered ferrite magnet of the present invention has the above main phases and a grain boundary phases. Because it is difficult to observe the grain boundary phases by an X-ray diffraction pattern, they are preferably observed by a transmission electron microscope, etc. The grain boundary phases observed in an arbitrary cross section of the sintered ferrite magnet include linear grain boundary phases existing between main phases, which may be called "two-grain boundary phases" by those skilled in the art; and grain boundary phases having a substantially polygonal (triangular) or irregular shape existing among three or more main phases, which may be called "triplet-junction grain boundary phases" by those skilled in the art.

The sintered ferrite magnet of the present invention may contain third phases containing a higher atomic ratio of La than in the main phases, in addition to the main phases and the grain boundary phases. The term "third phases" means phases different from the main phases (first phases) and the grain boundary phases (second phases), but do not define their ratio, the order of precipitation, etc. The third phases are not indispensable in the present invention, meaning that the presence or absence of the third phases does not change the construction and effects of the present invention. The sintered ferrite magnet of the present invention may contain foreign phases (spinel phases, etc.) and impurity phases observed in trace amounts (about 5% or less by mass) by X-ray diffraction, etc. The quantitative determination of foreign phases by X-ray diffraction can be conducted by such a method as Rietveld analysis.

Reasons for limiting x and y, and n representing a molar ratio in the above general formula will be explained below.

The amount (x) of La is $0.3 \leq x \leq 0.6$. With less than 0.3 or more than 0.6 of La, $B_r$ and $H_k/H_{cJ}$ are undesirably low. Part of La may be substituted by at least one of rare earth elements excluding La. The amount of La substituted is preferably 50% or less by molar ratio.

The amount (y) of Co is 0.25≤y≤0.5. The addition of less than 0.25 of Co does not sufficiently improve magnetic properties. With more than 0.5 of Co, Co-rich foreign phases are generated, undesirably reducing the magnetic properties drastically. The more preferred range is 0.25≤y≤0.4.

The symbol "n" represents a molar ratio of (Fe+Co) to (Ca+La), expressed by 2n=(Fe+Co)/(Ca+La). The molar ratio n is 3≤n≤6. When n is less than 3 or more than 6, the magnetic properties are undesirably deteriorated.

The molar ratio x/y of La to Co is preferably 1≤x/y≤3. The more preferred range is 1.2≤x/y≤2. By selecting a composition meeting these conditions, the magnetic properties can be further improved. When the amount of La>the amount of Co, namely, x>y, the magnetic properties are largely improved.

Though the above composition indicates the atomic ratios of metal elements, a composition including oxygen (O) is represented by the general formula of $Ca_{1-x}La_xFe_{2n-y}Co_yO_\alpha$, wherein x, y and α, and n representing a molar ratio meet
0.3≤x≤0.6,
0.25≤y≤0.5,
3≤n≤6, and
α=19 in a stoichiometric composition in which La and Fe are trivalent, and Co is divalent, with x=y, and n=6.

In the oxygen-including composition of the sintered ferrite magnet, the molar number of oxygen differs depending on the valences of Fe and Co, the value of n, etc. Also, a ratio of oxygen to the metal elements varies depending on the vacance of oxygen when sintered in a reducing atmosphere, the valences of Fe and Co in the ferrite phases, etc. Therefore, an actual molar number α of oxygen may be deviated from 19. Accordingly, the atomic ratios of metal elements are used in the present invention, because they can most easily define the composition.

The amount of $SiO_2$ is 0.2% to 0.35% by mass. More than 0.35% by mass of $SiO_2$ undesirably provides a high percentage of grain boundary phases, resulting in low magnetic properties. Less than 0.2% by mass of $SiO_2$ provides undesirably low $H_{cJ}$. The more preferred range of $SiO_2$ is 0.2% to 0.3% by mass. As described below, $SiO_2$ is added to the calcined body or the calcined powder, turned to liquid phases component during sintering, and exists in grain boundary phases in the sintered body (sintered magnet). The amount (% by mass) of $SiO_2$ is determined per 100% by mass in total of the percentages (% by mass) of Ca, La, Fe and Co, which are determined by the composition analysis of the sintered magnet, and converted to percentages as $CaCO_3$, $La(OH)_3$, $Fe_2O_3$ and $Co_3O_4$.

Though both $CaCO_3$ and $SiO_2$ are in general conventionally added as described above, the inventors have first found that in the case of CaLaCo ferrite, excellent magnetic properties can be obtained when only $SiO_2$ is added in an extremely small an amount of 0.2% to 0.35% by mass. This appears to be due to the fact that CaLaCo ferrite contains Ca as a main phase component, and that this Ca constitutes part of liquid phase components during sintering. Excellent magnetic properties obtained by adding only $SiO_2$ in an extremely small an amount of 0.2% to 0.35% by mass are remarkable not in the CaLaCo ferrites disclosed in Japanese Patent 3181559, JP 2006-104050 A, WO 2007/060757 A, WO 2007/077811 A, JP 2011-213575 A and WO 2008/105449 A, but in a CaLaCo ferrite comprising Ca, La, Fe and Co without Sr and Ba.

It is known that the stability of ferrite phases having a hexagonal M-type magnetoplumbite structure is in the order of Ba ferrite>Sr ferrite>SrLaCo ferrite>CaLaCo ferrite. In the CaLaCo ferrite, a factor of moving Ca, a main phase component, from main phases to liquid phases to constitute part of liquid phase components appears to be the instability of ferrite phases in the CaLaCo ferrite than in Ba ferrite, Sr ferrite and SrLaCo ferrite. If Ba and Sr were contained in CaLaCo ferrite, ferrite phases would be more stable, making difficult the movement of Ca from main phases to liquid phases. Thus, in the CaLaCo ferrites containing Ba and Sr, which are disclosed in WO 2007/060757 A, WO 2007/077811 A, JP 2011-213575 A and WO 2008/105449 A, liquid phase sintering would be difficult when only $SiO_2$ is added. For this reason, both $CaCO_3$ and $SiO_2$ have been generally added so far.

Because the amount of a sintering aid added has been drastically reduced by the present invention as described above, the resultant sintered body has a smaller percentage of grain boundary phases and a higher percentage of main phases, resulting in excellent magnetic properties. Also, with a larger average particle size of finely pulverized powder than in the conventional CaLaCo ferrites, the magnetic properties are not lowered. Because a smaller amount of a sintering aid is added in the present invention, the material cost can be reduced. Further, even with a larger average particle size of finely pulverized powder than in the conventional CaLaCo ferrites, magnetic properties on the same level as those of conventional CaLaCo ferrites can be obtained. For example, as shown in Example below, a sintered ferrite magnet according to the present invention, which is obtained by adding only 0.3% by mass of $SiO_2$ as a sintering aid to a calcined body of $Ca_{0.5}La_{0.5}Fe_{10.1}Co_{0.3}$, pulverizing it to an average particle size (measured by an air permeation method) of 0.8 μm, and molding and sintering the resultant powder, has magnetic properties equal to or higher than those of a sintered ferrite magnet, which is obtained by adding 0.6% by mass of $SiO_2$ and 0.7% by mass of $CaCO_3$ to the same calcined body, pulverizing it to an average particle size (measured by an air permeation method) of 0.6 μm, and molding and sintering the resultant powder. Namely, even with a larger average particle size by 0.2 μm, magnetic properties on the same level can be obtained. With a larger average particle size by 0.2 μm, a process cost can be reduced by a shorter pulverization time, and a shorter pressing cycle (a shorter dewatering time during press-molding). Also, a shorter pressing cycle can expand the life of a press-molding die, resulting in a lower production cost.

[2] Production Method of Sintered Ferrite Magnet

The production method of the sintered ferrite magnet of the present invention comprises the steps of mixing raw material powders to a composition comprising metal elements of Ca, La, Fe and Co, whose atomic ratios are represented by the general formula of $Ca_{1-x}La_xFe_{2n-y}Co_y$, wherein x and y, and n representing a molar ratio meet 0.3≤x≤0.6, 0.25≤y≤0.5, and 3≤n≤6, respectively, to obtain a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

0.2% to 0.35% by mass of $SiO_2$ being added to 100% by mass of the calcined body or the calcined powder.

In this method, all raw material powders (excluding $SiO_2$) are added before calcining. This method is thus called "prior-addition method."

Another method of the present invention for producing a sintered ferrite magnet comprises the steps of mixing raw material powders to a composition comprising metal elements of Ca, La, Fe and Co, whose atomic ratios are represented by the general formula of $Ca_{1-x}La_xFe_{2n-y}Co_y$, wherein x and y, and n representing a molar ratio meet $0.3 \le x \le 0.6$, $0 \le y \le 0.5$, and $3 \le n \le 6$, respectively, to obtain a raw material powder mixture;

calcining the raw material powder mixture to obtain a calcined body;

pulverizing the calcined body to obtain a calcined powder;

molding the calcined powder to obtain a green body; and sintering the green body to obtain a sintered body;

a raw material powder of Co being added to the calcined body or the calcined powder, such that the above y meets $0.25 \le y \le 0.5$ as a whole; and 0.2% to 0.35% by mass of $SiO_2$ being added to 100% by mass of the calcined body or the calcined powder.

In this method, (a) all raw material powders (excluding a raw material powder of Co, and $SiO_2$) are added before calcining; or (b) part of a raw material powder of Co and all other raw material powders than Co (excluding $SiO_2$) are added before calcining, and all or remaining part of the raw material of Co is added to the calcined body or the calcined powder after calcining and before molding, such that the value of y meets $0.25 \le y \le 0.5$ as a whole (hereinafter referring to as "post-addition method").

In the present invention, any of the prior-addition method and the post-addition method can produce the sintered ferrite magnet. Each step will be explained below.

(a) Mixing Step of Raw Material Powders

Prepared are raw material powders having a composition comprising metal elements of Ca, La, Fe and Co, whose atomic ratios are represented by the general formula of $Ca_{1-x}La_xFe_{2n-y}Co_y$, wherein x and y, and n representing a molar ratio meet $0.3 \le x \le 0.6$, $0.25 \le y \le 0.5$ ($0 \le y < 0.5$ in the case of the post-addition method), and $3 \le n \le 6$. Incidentally, reasons for restricting x and y, and n representing a molar ratio in the above general formula are the same as in the above sintered ferrite magnet.

Each raw material powder may be oxide, carbonate, hydroxide, nitrate, chloride, etc. of each metal, irrespective of its valence. Solutions of raw material powders may be used. Ca compounds may be carbonate, oxide, chloride, etc. of Ca. La compounds may be oxides such as $La_2O_3$; hydroxides such as $La(OH)_3$; carbonates such as $La_2(CO_3)_3 \cdot 8H_2O$, etc. Iron compounds may be iron oxide, iron hydroxide, iron chloride, mill scale, etc. Co compounds may be oxides such as $CoO$, $Co_3O_4$, etc.; hydroxides such as $CoOOH$, $Co(OH)_2$, $Co_3O_4 \cdot m_1H_2O$ ($m_1$ is a positive number), etc.; carbonates such as $CoCO_3$, etc.; and basic carbonates such as $m_2CoCO_3 \cdot m_3Co(OH)_2 \cdot m_4H_2O$, etc. ($m_2$, $m_3$ and $m_4$ are positive numbers).

As described above, an entire amount of the raw material powder of Co (for example, $Co_3O_4$ powder) may be added in the mixing step of raw material powders (before calcining) in the prior-addition method, or part or all of the raw material powder of Co may be added after calcining and before molding in the post-addition method.

To accelerate a calcining reaction, up to about 1% by mass of a B-containing compound such as $B_2O_3$, $H_3BO_3$, etc. may be added, if necessary. Particularly, the addition of $H_3BO_3$ is effective to improve $H_{cJ}$ and $B_r$. The amount of $H_3BO_3$ added is preferably 0.3% by mass or less, most preferably about 0.2% by mass. Less than 0.1% by mass of $H_3BO_3$ has a small effect of improving $B_r$, and more than 0.3% by mass of $H_3BO_3$ reduces $B_r$. Also, because $H_3BO_3$ has an effect of controlling the shape and size of crystal grains during sintering, it may be added after calcining (before fine pulverization and before sintering), or both before and after calcining.

The prepared raw material powders are mixed to provide a raw material powder mixture. The raw material powders may be mixed in a wet or dry manner. Stirring with media such as steel balls enables more uniform mixing of raw material powders. In wet mixing, water is preferably used as a solvent. To increase the dispersibility of raw material powders, known dispersants such as ammonium polycarboxylate, calcium gluconate, etc. may be used. The mixed raw material slurry may be calcined as it is or after dewatering.

(b) Calcining Step

The raw material powder mixture obtained by dry or wet mixing is heated in an electric furnace, a gas furnace, etc., to form a ferrite compound having a hexagonal M-type magnetoplumbite structure by a solid-phase reaction. This process is called "calcining," and the resultant compound is called "calcined body."

The calcining step is conducted preferably in an atmosphere having an oxygen concentration of 5% or more. At an oxygen concentration of less than 5%, abnormal grain growth, the formation of foreign phases, etc. occur. The more preferred oxygen concentration is 20% or more.

In the calcining step, a solid-phase reaction forming ferrite phases proceeds more as the temperature is elevated. At a calcining temperature of lower than 1100° C., unreacted hematite (iron oxide) remains, resulting in low magnetic properties. At a calcining temperature exceeding 1450° C., crystal grains excessively grow, needing too much time for pulverization. Accordingly, the calcining temperature is preferably 1100-1450° C., more preferably 1200-1350° C. The calcining time is preferably 0.5-5 hours. When $H_3BO_3$ is added before calcining, a ferritization reaction is accelerated, so that calcining can be conducted at 1100-1300° C.

(c) Addition of $SiO_2$ $SiO_2$ is added as a sintering aid. 0.2% to 0.35% by mass of $SiO_2$ is added to 100% by mass of the calcined body or the calcined powder after the calcining step and before the molding step. The addition of 0.35% by mass of $SiO_2$ undesirably increases the ratio of grain boundary phases, resulting in low $B_r$ and $H_{cJ}$. The addition of less than 0.2% by mass of $SiO_2$ undesirably lowers $H_{cJ}$. The more preferred range of $SiO_2$ is 0.2% to 0.3% by mass. For example, after $SiO_2$ is added to a calcined body obtained by the calcining step, the pulverization step may be carried out; $SiO_2$ may be added during the pulverization step; or after $SiO_2$ is added and mixed to the pulverized calcined body, the molding step may be carried out.

In addition to $SiO_2$ described above, $Cr_2O_3$, $Al_2O_3$, etc. may be added after the calcining step or before the molding step, to improve magnetic properties. Their amounts are preferably 5% or less by mass each.

(d) Pulverization Step

The calcined body is pulverized by a vibration mill, a ball mill, an attritor, etc. to provide a calcined powder. The calcined powder preferably has an average particle size of about 0.4-1.0 µm (measured by an air permeation method). As described above, even when the calcined powder (finely pulverized powder) has a larger average particle size than in the production of conventional sintered CaLaCo ferrite magnets, magnetic properties on the same level can be obtained in the present invention. Accordingly, the calcined body may have a relatively large average particle size of, for example, 0.8-1.0 μm. In the pulverization step, either dry pulverization or wet pulverization may be conducted, though both are preferably combined.

Wet pulverization is conducted using water and/or a non-aqueous solvent (an organic solvent such as acetone, ethanol, xylene, etc.) as a dispersion medium. The wet pulverization prepares a slurry of the calcined powder in a dispersion medium. 0.2-2% by mass, as a solid component ratio, of known dispersant and/or surfactant are preferably added to the slurry. After the wet pulverization, the slurry is preferably concentrated and blended.

In WO 2008/105449 A, a heat-treating and repulverizing step comprising a first fine pulverization step, a step of heat-treating powder obtained by the first fine pulverization step, and a second fine pulverization step of repulverizing the heat-treated powder is conducted as the pulverization step, thereby making the particle sizes of crystal grains smaller to increase the density of a magnet, and further controlling the shapes of crystal grains to improve magnetic properties. However, the above method of the present invention can provide a sintered ferrite magnet having excellent magnetic properties, without the heat-treating and repulverizing step.

(e) Molding Step

The slurry after the pulverization step is press-molded in a magnetic field or without a magnetic field, while removing a dispersion medium. Press-molding in a magnetic field can align the crystal orientations of particles, thereby drastically improving magnetic properties. Further, a dispersant and a lubricant may be added in an amount of 0.01-1% by mass each to improve orientation. Before molding, the slurry may be concentrated, if necessary. The concentration is preferably conducted by centrifugal separation, filter pressing, etc.

(f) Sintering Step

The green body obtained by press-molding is degreased, if necessary, and then sintered. The sintering is conducted in an electric furnace, a gas furnace, etc. The sintering is preferably conducted in an atmosphere having an oxygen concentration of 10% or more. Less than 10% of the oxygen concentration causes abnormal grain growth, the formation of foreign phases, etc., thereby deteriorating magnetic properties. The oxygen concentration is more preferably 20% or more, most preferably 100%. The sintering temperature is preferably 1150-1250° C. The sintering time is preferably 0.5-2 hours. A sintered magnet obtained by the sintering step has an average crystal grain size of about 0.5-2 μm. The larger the average particle size of the calcined powder (finely pulverized powder), the slightly larger the average crystal grain size of the sintered magnet.

The sintered ferrite magnet is subjected to known production steps such as machining, cleaning, inspection, etc.

The present invention will be explained in further detail by Examples below, without intention of restricting the present invention thereto.

EXAMPLE 1

$CaCO_3$ powder, $La(OH)_3$ powder, $Fe_2O_3$ powder, and $Co_3O_4$ powder were mixed to a composition represented by the formula of $Ca_{1-x}La_xFe_{2n-y}Co_y$, wherein x=0.5, y=0.3, and n=5.2, and 0.1% by mass of $H_3BO_3$ powder was added to 100% by mass in total of the mixed powders to prepare a raw material powder mixture. The raw material powder mixture was wet-ball-milled for 4 hours, and dried to granules, which was then calcined at 1300° C. for 3 hours in the air. The resultant calcined body was coarsely pulverized by a hammer mill to obtain calcined powder (coarse powder).

$SiO_2$ powder and $CaCO_3$ powder were added in the amounts shown in Table 1 to 100% by mass of the coarse powder. In this Example and Comparative Examples, the amount of $CaCO_3$ is expressed by the amount of CaO. The amount of $CaCO_3$ added can be determined from the amount as CaO by the equation:

(Molecular weight of $CaCO_3$×amount as CaO)/molecular weight of CaO.

For example, when 0.7% by mass as CaO of $CaCO_3$ is added, the amount of $CaCO_3$ added is [100.09 (molecular weight of $CaCO_3$)×0.7% by mass (amount as CaO)]/56.08 (molecular weight of CaO)=1.249% by mass.

The coarse powder was then finely pulverized to an average particle size (measured by an air permeation method) shown in Table 1 by wet ball-milling using water as a dispersant, to obtain a slurry comprising the calcined powder (finely pulverized powder) in a concentration of 60%. The fine pulverization time was 20 hours to an average particle size of 0.8 μm, and 35 hours to an average particle size of 0.6 μm.

Using a parallel-magnetic-field molding die (vertical-magnetic-field molding die), in which a magnetic field was in parallel with a compression direction, three green bodies were formed by one pressing. Specifically, the slurry was charged into three cavities each having a diameter of 25 mm and a filling depth of 30 mm, to which a magnetic field of about 1.3 T was applied, and each lower punch was moved upward to carry out molding at a final pressure of 50 MPa while removing the dispersant on the upper punch side, thereby obtaining three cylindrical green bodies of 25 mm in diameter, whose longitudinal direction was in alignment with the magnetic field. In the molding step, a time period from the start of moving the lower punch to the increase of the molding pressure was measured. As a result, the time period was 40 seconds when the average particle size of the finely pulverized powder was 0.8 μm, and 60 seconds when the average particle size of the finely pulverized powder was 0.6 μm. Because the molding pressure does not substantially increase while the dispersant is removed, the time period until the molding pressure increases corresponds to a time period until substantially all the dispersant is removed.

Three green bodies obtained by the molding step were introduced into a sintering furnace, and sintered at 1200° C. for 1 hour in the air to obtain sintered ferrite magnets. The measured $B_r$, $H_{cJ}$ and $H_k/H_{cJ}$ of the sintered ferrite magnets are shown in Table 1. $B_r$, $H_{cJ}$ and $H_k/H_{cJ}$ were average values in three sintered ferrite magnets. In $H_k/H_{cJ}$, $H_k$ represents the value of H at a position in the second quadrant at which J is 0.95 $B_r$ in a curve of J (intensity of magnetization) to H (intensity of magnetic field). This is also true in Examples below.

TABLE 1

| Sample | Amount of $SiO_2$ (% by mass) | Amount of $CaCO_3$ (as CaO) (% by mass) | Average Particle Size of Finely Pulverized Powder (μm) | $B_r$ (T) | $H_{cJ}$ (kA/m) | $H_k/H_{cJ}$ (%) |
|---|---|---|---|---|---|---|
| 1* | 0.1 | 0 | 0.8 | 0.462 | 192.3 | 90 |
| 2 | 0.2 | 0 | 0.8 | 0.463 | 300.1 | 89 |
| 3 | 0.3 | 0 | 0.6 | 0.460 | 354.2 | 88 |
| 4 | 0.3 | 0 | 0.8 | 0.460 | 370.1 | 88 |
| 5 | 0.35 | 0 | 0.8 | 0.455 | 360.0 | 85 |
| 6* | 0.4 | 0 | 0.8 | 0.444 | 311.8 | 82 |
| 7* | 0.6 | 0.7 | 0.6 | 0.457 | 367.5 | 86 |
| 8* | 0.6 | 0.7 | 0.8 | 0.452 | 358.1 | 82 |
| 9* | 0.3 | 0.2 | 0.6 | 0.464 | 298.0 | 89 |
| 10* | 0.3 | 0.3 | 0.6 | 0.463 | 200.8 | 90 |
| 11* | 0.3 | 0.2 | 0.8 | 0.460 | 220.1 | 93 |
| 12* | 0.3 | 0.3 | 0.8 | 0.460 | 191.1 | 93 |

Note:
*Comparative Example.

As shown in Table 1, when only $SiO_2$ was added (Samples 1-6), excellent magnetic properties were obtained at 0.2% to 0.35% by mass (Samples 2-5). In the case of adding only $SiO_2$ in an amount of 0.3% by mass, the comparison of Samples 3 and 4, in which the average particle size of finely pulverized powder was 0.6 μm and 0.8 μm, respectively, revealed that in the present invention, magnetic properties were not low even when the finely pulverized powder having a large average particle size was used.

Sample 3 of the present invention (amount of $SiO_2$: 0.3% by mass, and average particle size of finely pulverized powder: 0.6 μm) has magnetic properties on the same level as those of Sample 7 of Comparative Example [amount of $SiO_2$: 0.6% by mass, amount (as CaO) of $CaCO_3$: 0.7% by mass, and average particle size of finely pulverized powder: 0.6 μm], despite a smaller amount of the sintering aid. Sample 3 of the present invention with a smaller amount of the sintering aid has a lower material cost than that of Sample 7.

Sample 4 of the present invention (amount of $SiO_2$: 0.3% by mass, and average particle size of finely pulverized powder: 0.8 μm) has magnetic properties equal to or higher than those of Sample 7 of Comparative Example [amount of $SiO_2$: 0.6% by mass, amount (as CaO) of $CaCO_3$: 0.7% by mass, and average particle size of finely pulverized powder: 0.6 μm], despite a larger average particle size by 0.2 μm. Having a larger average particle size by 0.2 μm, Sample 4 of the present invention enjoys a shorter pulverization time, and a shorter pressing cycle (a shorter dewatering time in press-molding), resulting in decreased process cost. In addition, a shorter pressing cycle expands the life of a press-molding die, resulting in decreased production cost.

Though Sample 4 of the present invention had the same average particle size (0.8 μm) as that of Sample 8 of Comparative Example [amount of $SiO_2$: 0.6% by mass, amount (as CaO) of $CaCO_3$: 0.7% by mass, and average particle size of finely pulverized powder: 0.8 μm], Sample 4 of the present invention was higher in all of $B_r$, $H_{cJ}$ and $H_k/H_{cJ}$.

As is clear from the comparison of Samples 9-12 of Comparative Examples [amount of $SiO_2$: 0.3% by mass, and amount (as CaO) of $CaCO_3$: 0.2-0.3% by mass] with Sample 4 of the present invention, Samples 9-12 of Comparative Examples had smaller $H_{cJ}$ than that of Sample 4 of the present invention, and their $H_{cJ}$ decreased as the amount of $CaCO_3$ increased, though they had substantially the same $B_r$. It is thus clear that when 0.3% by mass of $SiO_2$ is added, the further addition of $CaCO_3$ decreases $H_{cJ}$. Namely, when only $SiO_2$ is added as in Sample 4 of the present invention, excellent magnetic properties are obtained.

EXAMPLE 2

Sintered ferrite magnets were produced in the same manner as in Example 1, except that x was 0.55 in the composition formula of $Ca_{1-x}La_xFe_{2n-y}Co_y$, that $SiO_2$ powder and $CaCO_3$ powder were add in the amounts shown in Table 2, that fine pulverization was conducted to the average particle size shown in Table 2, and that sintering was conducted at 1210° C. The measured $B_r$, $H_{cJ}$ and $H_k/H_{cJ}$ of the sintered ferrite magnets are shown in Table 2.

TABLE 2

| Sample | Amount of $SiO_2$ (% by mass) | Amount (as CaO) of $CaCO_3$ (% by mass) | Average Particle Size of Finely Pulverized Powder (μm) | $B_r$ (T) | $H_{cJ}$ (kA/m) | $H_k/H_{cJ}$ (%) |
|---|---|---|---|---|---|---|
| 13* | 0.1 | 0 | 0.8 | 0.459 | 296.6 | 83 |
| 14 | 0.2 | 0 | 0.8 | 0.458 | 294.7 | 87 |
| 15 | 0.3 | 0 | 0.8 | 0.456 | 284.4 | 95 |
| 16 | 0.35 | 0 | 0.8 | 0.454 | 284.2 | 95 |
| 17* | 0.4 | 0 | 0.8 | 0.448 | 284.0 | 95 |
| 18* | 0.6 | 0.7 | 0.6 | 0.459 | 301.6 | 94 |
| 19* | 0.6 | 0.7 | 0.8 | 0.454 | 293.0 | 93 |

Note:
*Comparative Example.

In this Example, the composition of the sintered ferrite magnet was changed. Specifically, it differed from Example 1 (x=0.5) in that x=0.55. As shown in Table 2, substantially the same results as in Example 1 were obtained even when the composition of the sintered ferrite magnet was changed. Namely, when only $SiO_2$ was added, excellent magnetic properties were obtained at 0.2-0.35% by mass. 0.1% by mass of $SiO_2$ provided large $H_{cJ}$ and low $H_k/H_{cJ}$. Also, Sample 15 of the present invention (only 0.3% by mass of $SiO_2$ added, and average particle size of finely pulverized powder: 0.8 μm) had magnetic properties on the same level as those of Sample 18 of Comparative Example [$SiO_2$: 0.6% by mass, $CaCO_3$: 0.7% by mass (as CaO), and average particle size of finely pulverized powder: 0.6 μm], despite a larger average particle size by 0.2 μm.

EXAMPLE 3

Sintered ferrite magnets were produced in the same manner as in Example 1, except that y=0.25, and n=5.0, in the composition formula of $Ca_{1-x}La_xFe_{2n-y}Co_y$, that $SiO_2$ powder and $CaCO_3$ powder were add in the amounts shown in Table 3, that fine pulverization was conducted to the average particle size shown in Table 3, and that sintering was conducted at 1190° C. The measured $B_r$, $H_{cJ}$ and $H_k/H_{cJ}$ of the sintered ferrite magnets are shown in Table 3.

TABLE 3

| Sample | Amount of $SiO_2$ (% by mass) | Amount (as CaO) of $CaCO_3$ (% by mass) | Average Particle Size of Finely Pulverized Powder (μm) | $B_r$ (T) | $H_{cJ}$ (kA/m) | $H_k/H_{cJ}$ (%) |
|---|---|---|---|---|---|---|
| 20* | 0.1 | 0 | 0.8 | 0.459 | 209.3 | 89 |
| 21 | 0.2 | 0 | 0.8 | 0.457 | 266.9 | 87 |
| 22 | 0.3 | 0 | 0.8 | 0.458 | 257.4 | 94 |
| 23 | 0.35 | 0 | 0.8 | 0.456 | 310.5 | 95 |
| 24* | 0.4 | 0 | 0.8 | 0.440 | 300.1 | 95 |
| 25* | 0.6 | 0.7 | 0.6 | 0.456 | 296.0 | 94 |
| 26* | 0.6 | 0.7 | 0.8 | 0.452 | 300.3 | 94 |

Note:
*Comparative Example.

In this Example, the composition of the sintered ferrite magnet was changed. Specifically, it differed from Example 1 (y=0.3, n=5.2) in that y=0.25, and n=5.0. As shown in Table 3, substantially the same results as in Example 1 were obtained even when the composition of the sintered ferrite magnet was changed. Namely, when only $SiO_2$ was added, excellent magnetic properties were obtained at 0.2-0.35% by mass. Sample 23 of the present invention (only 0.35% by mass of $SiO_2$ added, and average particle size of finely pulverized powder: 0.8 μm) had magnetic properties equal to or higher than those of Sample 25 of Comparative Example [amount of $SiO_2$: 0.6% by mass, amount (as CaO) of $CaCO_3$: 0.7% by mass, and average particle size of finely pulverized powder: 0.6 μm], despite a larger average particle size by 0.2 μm.

EXAMPLE 4

Figure 1B:
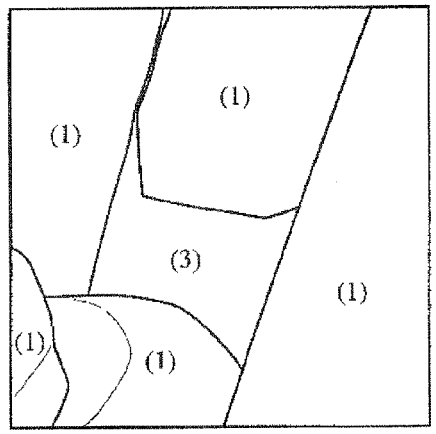
FIG. 1B is a drawing of the photograph which labels the phases of the photograph.
Figure 2A:
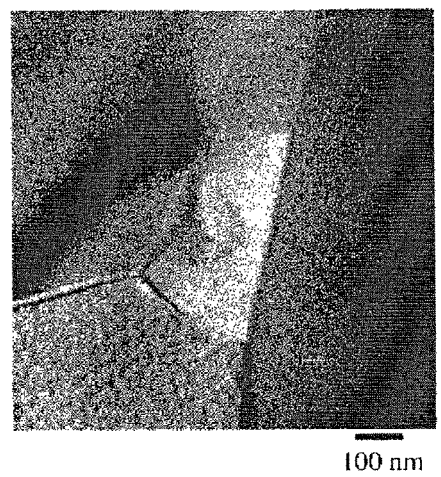
FIG. 2A is a photograph showing the structure observation results by FE-TEM of the sintered ferrite magnet of Sample 4 in Example 1.
Figure 2B:
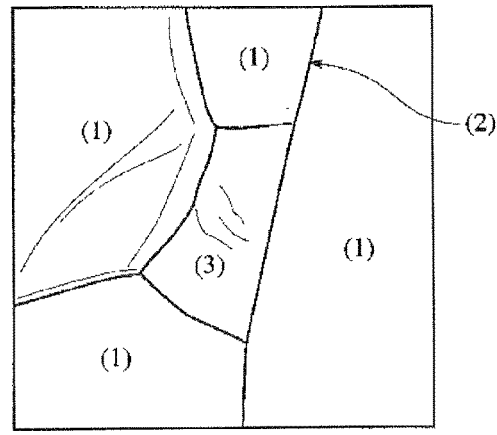
FIG. 2B is a drawing of the photograph which labels the phases of the photograph.
Figure 3A:
FIG. 3A is a photograph showing the structure observation results by FE-TEM of the sintered ferrite magnet of Sample 7 in Example 1.
Figure 3B:
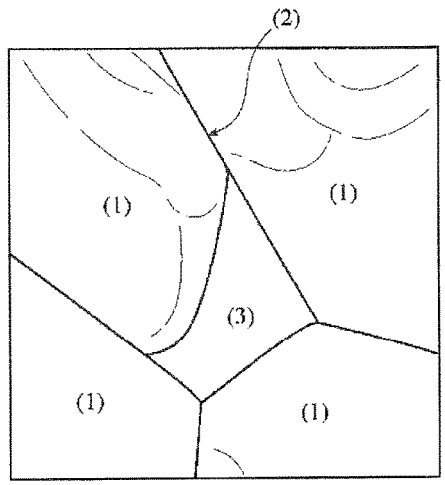
FIG. 3B is a drawing of the photograph which labels the phases of the photograph.
Figure 4A:
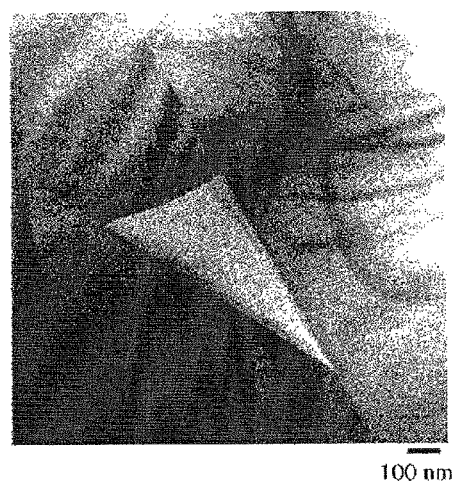
FIG. 4A is a photograph showing the structure observation results by FE-TEM of the sintered ferrite magnet of Sample 7 in Example 1.
Figure 4B:
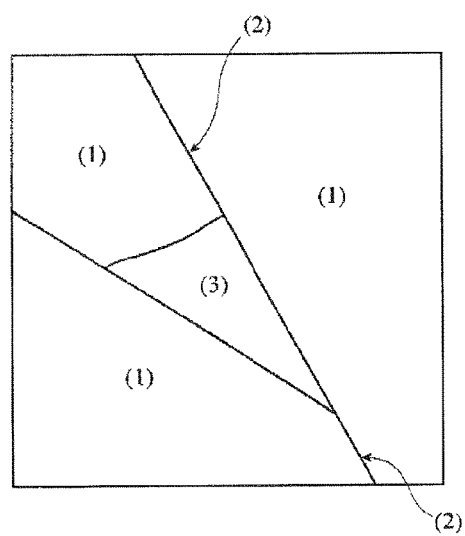
FIG. 4B is a drawing of the photograph which labels the phases of the photograph.

The sintered ferrite magnet of Sample 4 of the present invention (amount of $SiO_2$: 0.3% by mass, and average particle size of finely pulverized powder: 0.8 μm) produced in Example 1, and the sintered ferrite magnet of Sample 7 of Comparative Example [amount of $SiO_2$: 0.6% by mass, amount (as CaO) of $CaCO_3$: 0.7% by mass, and average particle size of finely pulverized powder: 0.6 μm] were subjected to structure observation by a field-emission transmission electron microscope (FE-TEM), and composition analysis by energy-dispersive X-ray spectroscopy (EDS). The structure observation was conducted in a plane (c-plane) perpendicular to the axial direction of the cylindrical sintered magnet, and the structure of the cylindrical sintered magnet was photographed at two points in an arbitrary cross section. The structure observation results are shown in FIGS. 1A-B and 2A-B for Sample 4 of the present invention, and in FIGS. 3A-B and 4A-B for Sample 7 of Comparative Example. The composition analysis was conducted on five arbitrary grain boundary phases existing between three or more main phases (triplet-junction grain boundary phases), and three arbitrary main phases, in a plane (c-plane) perpendicular to the axial direction of the cylindrical sintered magnet.

The composition analysis results are shown in Tables 4 and 5 for Sample 4 of the present invention, and in Tables 6 and 7 for Sample 7 of Comparative Example. Tables 4 and 6 show the composition analysis results of triplet-junction grain boundary phases, and Tables 5 and 7 show the composition analysis results of main phases. The (triplet-junction) grain boundary phases 1-5 in Tables 4 and 6, and the main phases 1-3 in Tables 5 and 7 conveniently have numbers assigned to arbitrary points subjected to composition analysis. The amount of each element is expressed by "atomic %."

TABLE 4

| Grain boundary phase | Element (atomic %) | | | | | |
|---|---|---|---|---|---|---|
| | Si | Ca | La | Fe | Co | P |
| 1 | 28.7 | 63.0 | 2.6 | 4.0 | — | 1.7 |
| 2 | 27.2 | 66.0 | 1.6 | 3.5 | — | 1.7 |
| 3 | 31.7 | 58.9 | 2.0 | 5.6 | — | 1.8 |
| 4 | 29.3 | 59.6 | 3.3 | 6.6 | — | 1.2 |
| 5 | 30.3 | 62.6 | 1.3 | 3.9 | — | 1.9 |
| Average | 29.4 | 62.0 | 2.2 | 4.7 | — | 1.7 |

TABLE 5

| Main Phase | Element (atomic %) | | | | | |
|---|---|---|---|---|---|---|
| | Si | Ca | La | Fe | Co | P |
| 1 | — | 3.1 | 4.7 | 88.7 | 3.5 | — |
| 2 | — | 3.5 | 4.8 | 88.5 | 3.2 | — |
| 3 | — | 2.6 | 4.1 | 90.3 | 3.0 | — |
| Average | — | 3.1 | 4.5 | 89.2 | 3.2 | — |

TABLE 6

| Grain boundary phase | Element (atomic %) | | | | | |
|---|---|---|---|---|---|---|
| | Si | Ca | La | Fe | Co | P |
| 1 | 29.8 | 62.7 | 1.2 | 5.2 | — | 1.1 |
| 2 | 30.7 | 61.8 | 1.5 | 6.0 | — | — |
| 3 | 30.7 | 63.2 | 1.7 | 4.4 | — | — |
| 4 | 29.6 | 61.2 | 1.9 | 6.0 | — | 1.3 |
| 5 | 31.6 | 60.3 | 1.0 | 7.1 | — | — |
| Average | 30.5 | 61.8 | 1.5 | 5.7 | — | 0.5 |

TABLE 7

| Main Phase | Element (atomic %) | | | | | |
|---|---|---|---|---|---|---|
| | Si | Ca | La | Fe | Co | P |
| 1 | — | 3.3 | 3.3 | 90.5 | 2.9 | — |
| 2 | — | 3.5 | 4.5 | 88.8 | 3.2 | — |
| 3 | — | 3.1 | 4.9 | 88.6 | 3.4 | — |
| Average | — | 3.3 | 4.2 | 89.3 | 3.2 | — |

It is clear from FIGS. 1A-B, 2A-B, 3A-B, and 4A-B that both Sample 4 of the present invention and Sample 7 of Comparative Example had main phases (1), linear grain boundary phases existing between main phases [two-grain boundary phases (2)], and grain boundary phases existing between three or more main phases [triplet-junction grain boundary phases (3)].

It is clear from Table 4 that triplet-junction grain boundary phases in Sample 4 of the present invention contained much Si. Si was derived from $SiO_2$ added as a sintering aid to the calcined body or the calcined powder. It is presumed that Ca, La and Fe in triplet-junction grain boundary phases moved from main phases. It is characteristic that P (phosphorus) was contained in triplet-junction grain boundary phases. It is presumed that P, an impurity in Fe, moved from main phases to liquid phases together with Ca during the liquid phase sintering, and was concentrated in triplet-junction grain boundary phases. In this Example, P was detected in all five triplet-junction grain boundary phases subjected to composition analysis.

As shown in Table 6, Si was also contained in triplet-junction grain boundary phases in Sample 7 of Comparative Example. Si was derived from $SiO_2$ added as a sintering aid to the calcined body or the calcined powder. Most of Ca in triplet-junction grain boundary phases was presumably derived from $CaCO_3$ added as a sintering aid to the calcined body or the calcined powder, and part of Ca presumably moved from main phases. La and Fe in triplet-junction grain boundary phases presumably moved from main phases. Unlike Sample 4 of the present invention, some triplet-junction grain boundary phases in Sample 7 of Comparative Example contained P.

As is clear from Tables 4 and 6, triplet-junction grain boundary phases in Sample 4 of the present invention and Sample 7 of Comparative Example were substantially the same in components (Si, Ca, La, and Fe). Namely, regardless of the addition of $CaCO_3$, the percentages of Si, Ca, La, and Fe in triplet-junction grain boundary phases were substantially 30/60/2/5. This result indicates that in Sample 4 of the present invention, Ca moved from main phases to liquid phases during liquid phase sintering.

EXAMPLE 5

The sintered ferrite magnet of Sample 4 of the present invention (amount of $SiO_2$: 0.3% by mass, and average particle size of finely pulverized powder: 0.8 µm) produced in Example 1, and the sintered ferrite magnet of Sample 7 of Comparative Example [amount of $SiO_2$: 0.6% by mass, amount (as CaO) of $CaCO_3$: 0.7% by mass, and average particle size of finely pulverized powder: 0.6 µm] were subjected to structure observation by backscattered electron (BSE) image using a field-emission scanning electron microscope (FE-SEM). The structure observation was conducted on a plane (c-plane) perpendicular to the axial direction of the cylindrical sintered magnet, and the structure was photographed with magnification of 2000 times in four fields (a)-(d) in an arbitrary cross section. Each structure photograph was binarized to separate grain boundary phases existing between three or more main phases (triplet-junction grain boundary phases) from a background image, thereby determining the area of all triplet-junction grain boundary phases, and thus an area ratio of the triplet-junction grain boundary phases to the entire structure. The area ratio of triplet-junction grain boundary phases in each of four fields, and an average area ratio in four fields are shown in Table 8. The binarized images of the field (a) are shown in FIGS. 5 and 6. FIG. 5 shows Sample 4 of the present invention, and FIG. 6 shows Sample 7 of Comparative Example. In FIGS. 5 and 6, triplet-junction grain boundary phases are expressed by white regions by image treatment. By analyzing this image, the area of white regions (triplet-junction grain boundary phases) on the image was determined.

TABLE 8

| Field | Sample 4 | Sample 7 |
|---|---|---|
| (a) | 1.9% | 3.1% |
| (b) | 1.5% | 3.8% |
| (c) | 2.2% | 3.5% |
| (d) | 2.4% | 4.0% |
| Average | 2.0% | 3.6% |

As is clear from FIGS. 5 and 6, the sintered ferrite magnet of the present invention (Sample 4) shown in FIG. 5 had less triplet-junction grain boundary phases than in the sintered ferrite magnet of Comparative Example (Sample 7) shown in FIG. 6. As shown in Table 8, the average area ratio of triplet-junction grain boundary phases was 3.6% in the sintered ferrite magnet (Sample 7) of Comparative Example, and 2.0% in the sintered ferrite magnet of the present invention (Sample 4), the latter was smaller than the former. A smaller area ratio of grain boundary phases means a smaller percentage of grain boundary phases in the entire sintered ferrite magnet, resulting in a larger percentage of main phases. Accordingly, as shown in Table 1 in Example 1, Sample 4 of the present invention had magnetic properties equal to or higher than those of Sample 7 of Comparative Example, in spite of the fact that the average particle size of Sample 4 of the present invention was larger than that of Sample 7 of Comparative Example by 0.2 µm. Because the finely pulverized powder has a large average particle size in the sintered ferrite magnet of the present invention, the pulverization time and the dewatering time in press-molding, namely the pressing cycle, can be made shorter, resulting in a decreased process cost. Because a shorter pressing cycle expands the life of a press-molding die, the production cost can be reduced.

Analysis by EBSD revealed that the sintered ferrite magnet of the present invention (Sample 4) shown in FIG. 5 had an average crystal grain size of 3.39 µm, and the sintered ferrite magnet (Sample 7) of Comparative Example shown in FIG. 6 had an average crystal grain size of 2.53 µm.

Assuming that individual crystals in the sintered magnet were spherical, their specific areas were calculated. As a result, it was 0.174 m²/g in the sintered ferrite magnet of the present invention (Sample 4), and 0.233 m²/g in the sintered ferrite magnet (Sample 7) of Comparative Example, suggesting that the sintered ferrite magnet (Sample 4) of the present invention having only SiO₂ added in an amount of 0.3% by mass and obtained from finely pulverized powder having an average particle size of 0.6 μm had a smaller specific surface area. These results suggest that the sintered ferrite magnet of the present invention (Sample 4) has a smaller specific surface area of crystals than that of the sintered ferrite magnet (Sample 7) of Comparative Example, despite a smaller amount of the sintering aid added, liquid phases can uniformly exist in main phase interfaces to some extent during the liquid phase sintering. Namely, it is presumed that grain boundary phases exist uniformly in main phase interfaces in the sintered ferrite magnet, so that main phases are magnetically isolated, resulting in higher magnetic properties. For such reason, the sintered ferrite magnet of the present invention (Sample 4) had magnetic properties equal to or higher than those of the sintered ferrite magnet (Sample 7) of Comparative Example, despite a larger average particle size by 0.2 μm.

Effect of the Invention

The present invention provides inexpensive sintered ferrite magnets having excellent magnetic properties. Because of a smaller amount of a sintering aid added, the material cost can be reduced, and the magnetic properties are not deteriorated even when the average particle size of finely pulverized powder is increased. With a larger average particle size of finely pulverized powder, the process cost can be reduced by a shorter pulverization time and a shorter pressing cycle during press-molding, and the life of a press-molding die can be expanded by a shorter pressing cycle, resulting in lower production cost.

Using the sintered ferrite magnet of the present invention, electric parts for automobiles, electric equipment parts, etc. such as various motors, electric generators, speakers, etc., which have high performance with reduced sizes and weights, can be obtained.

INDUSTRIAL APPLICABILITY

The sintered ferrite magnet of the present invention can be used for electric parts for automobiles, electric equipment parts, etc. such as various motors, electric generators, speakers, etc., contributing to improving their performance with reduced sizes and weights.

What is claimed is:

1. A sintered ferrite magnet comprising metal elements of Ca, La, Fe and Co, whose atomic ratios are represented by the general formula:

$$Ca_{1-x}La_xFe_{2n-y}Co_y,$$

wherein x and y, and n representing a molar ratio meet
0.3≤x≤0.6,
0.25≤y≤0.5, and
3≤n≤6,
further comprising 0.2% to 0.35% by mass of SiO₂, and containing no CaCO₃ as a sintering aid.

2. The sintered ferrite magnet according to claim 1, wherein 0.2% to 0.3% by mass of SiO₂ is contained.

3. A method for producing a sintered ferrite magnet comprising the steps of mixing raw material powders to a composition comprising metal elements of Ca, La, Fe and Co, whose atomic ratios are represented by the general formula:

$$Ca_{1-x}La_xFe_{2n-y}Co_y,$$

wherein x and y, and n representing a molar ratio meet
0.3≤x≤0.6,
0.25≤y≤0.5, and
3≤n≤6,
thereby obtaining a raw material powder mixture;
calcining said raw material powder mixture to obtain a calcined body;
pulverizing said calcined body to obtain a calcined powder;
molding said calcined powder to obtain a green body; and
sintering said green body to obtain a sintered body;
a sintering aid being add after said calcining step and before said molding step;
said sintering aid indispensably comprising SiO₂ without CaCO₃; and
the amount of SiO₂ added being 0.2% to 0.35% by mass based on 100% by mass of said calcined body or said calcined powder.

4. A method for producing a sintered ferrite magnet comprising the steps of
mixing raw material powders to a composition comprising metal elements of Ca, La, Fe and Co, whose atomic ratios are represented by the general formula:

$$Ca_{1-x}La_xFe_{2n-y}Co_y,$$

wherein x and y, and n representing a molar ratio meet
0.3≤x≤0.6,
0≤y<0.5, and
3≤n≤6,
thereby obtaining a raw material powder mixture;
calcining said raw material powder mixture to obtain a calcined body;
pulverizing said calcined body to obtain a calcined powder;
molding said calcined powder to obtain a green body; and
sintering said green body to obtain a sintered body;
a raw material powder of Co being added after said calcining step and before said molding step, such that said y meets 0.25≤y≤0.5;
a sintering aid being add after said calcining step and before said molding step;
said sintering aid indispensably comprising SiO₂ without CaCO₃; and
the amount of SiO₂ added being 0.2% to 0.35% by mass based on 100% by mass of said calcined body or said calcined powder.

5. The method for producing a sintered ferrite magnet according to claim 3, wherein 0.2% to 0.3% by mass of SiO₂ is added.

6. The method for producing a sintered ferrite magnet according to claim 4, wherein 0.2% to 0.3% by mass of SiO₂ is added.

* * * * *